United States Patent [19]

Sherrod

[11] Patent Number: 4,565,207

[45] Date of Patent: Jan. 21, 1986

[54] METHOD FOR PROPORTIONING FUEL USAGE BY A FLUID FUELED APPARATUS

[76] Inventor: Donnell Sherrod, 327 Allendale St., Baltimore, Md. 21229

[21] Appl. No.: 659,635

[22] Filed: Oct. 11, 1984

Related U.S. Application Data

[62] Division of Ser. No. 291,515, Aug. 10, 1981, Pat. No. 4,478,246.

[51] Int. Cl.$^4$ .............................................. F17D 1/04
[52] U.S. Cl. ...................................... 137/1; 137/557; 137/601; 137/607; 137/870
[58] Field of Search .................. 137/1, 552, 557, 599, 137/601, 606, 607, 862, 870

[56] References Cited

U.S. PATENT DOCUMENTS

| | | | |
|---|---|---|---|
| 1,892,775 | 1/1933 | Mix et al. | 137/606 |
| 1,892,776 | 1/1933 | Mix et al. | 137/606 |
| 3,135,282 | 6/1964 | Gray | 137/599 |
| 3,280,841 | 10/1966 | Deutsch | 137/606 |
| 3,905,394 | 9/1975 | Jerde | 137/599 |
| 4,174,733 | 11/1979 | Eidsmore et al. | 137/552 |
| 4,191,215 | 3/1980 | Gonner | 137/599 |
| 4,256,100 | 3/1981 | Levy et al. | 137/599 |
| 4,262,686 | 4/1981 | Heim et al. | 137/607 |

*Primary Examiner*—Alan Cohan
*Assistant Examiner*—John A. Rivell
*Attorney, Agent, or Firm*—Sachs & Sachs

[57] ABSTRACT

A fluid proportioning system for apportioning fuel usage among several discrete fluid fuel supplies which are used to supply fluid fuel to a single commonly used apparatus. An application for the invention is in a multidwelling unit wherein each unit is heated from a common furnace. Each tenant's metered gas line is tapped in proportion to the amount of heat necessary to heat their dwelling unit by the adjustment of precision valves, the gas from each line being combined in a manifold. Means are provided to preclude interaction of the individually metered gas lines when the furnace is not consuming gas.

2 Claims, 1 Drawing Figure

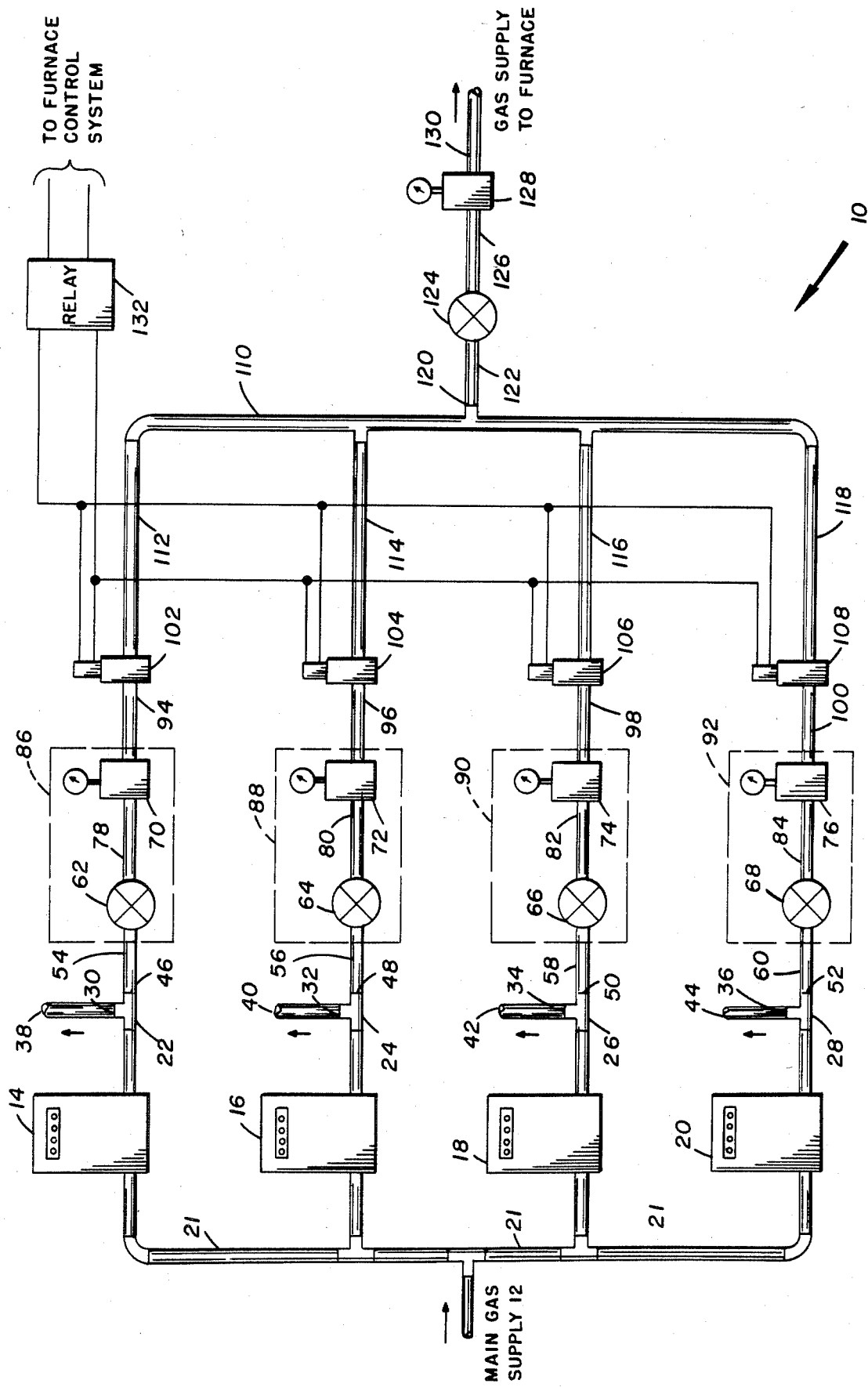

METHOD FOR PROPORTIONING FUEL USAGE BY A FLUID FUELED APPARATUS

CROSS REFERENCE TO RELATED APPLICATION

This application is a divisional application of Ser. No. 291,515 filed Aug. 10, 1981 now U.S. Pat. No. 4,478,216 published Oct. 23, 1984.

BACKGROUND AND/OR ENVIRONMENT OF THE INVENTION

1. Field of the Invention

The present invention relates to fluid proportioning systems, and more particularly to a method and apparatus for apportioning gas usage by a gas fueled apparatus among several individually metered gas supplies.

2. Description of the Prior and/or Contemporaneous Art

Many multiunit dwellings employ a single heating system which supplies heat to each dwelling unit. This is especially the case in large single family dwellings which have been converted to multifamily dwellings. Heretofore, in most cases, the landlord must underwrite the cost of heating each of the units since the heating units are usually supplied from a single fuel supply, the cost of which is billed directly to the landlord. This results in a situation where the landlord's expenses are disproportionately high in the months that heat is needed. Additionally, since tenants customarily pay a flat amount of rent regardless of the amount of heat used, they do not have an interest in conserving heat and, in many instances, this leads to excessive heat consumption.

One method of limiting the expense to the landlord is by installation of a locked thermostat so that tenants cannot cause a furnace to supply an unreasonable amount of heat. Unfortunately, this does not do anything to reallocate the cost of heating to each individual tenant. Another more radical approach is to install individual heating units or furnaces in each dwelling unit. While this solves the problem, the cost in many instances is prohibitive. Additionally, because of the inherent heat losses through furnace chimneys and combustion chambers, a plurality of furnaces having the same heating capacity as one large furnace will have greater heat losses and therefore will be less efficient.

In many of these multiunit dwellings, each individual tenant has a metered supply of gas provided to the gas range and other similar appliances disposed in the dwelling unit. However, these are entirely isolated from the metered supply of gas which is supplied to the common heating furnace. The present invention provides an apparatus and method for equitably apportioning the fuel needed to supply a common furnace among a plurality of metered fuel supplies, each which is billed individually to the tenants of a multiunit dwelling.

U.S. Pat. Nos. 1,892,775 and 1,892,776, both issued to Mix et al on Jan. 3, 1933, each teach fluid control apparatuses wherein a plurality of tenants' metered gas lines are employed to run a laundry stove. This apparatus permits selective individual channeling of the tenants' metered gas to the stove for use at any particular time by a single tenant. No means are shown or suggested for the joint use of the laundry stove by all the tenants through simultaneous supply of gas from each tenant's metered gas line. The Mix patents are the sole references uncovered which seek to equitably attribute gas usage to the tenant deriving benefit from such usage.

Other fluid and fuel mixing and proportioning apparatuses are known in the art for application for diverse purposes. U.S. Pat. No. 3,280,841 issued to Deutsch on Oct. 25, 1966 discloses a fluid mixing and proportioning apparatus wherein two fluid inputs are fed through separate valve and pressure meter arrangements. These two arrangements are manifolded together to provide a single output.

U.S. Pat. No. 3,331,392 issued to Davidson et al on July 18, 1967 teaches a gasoline supply manifold wherein a plurality of gasoline lines are individually hooked to a manifold by a plurality of discrete valves, the output of the manifold being supplied to a gasoline engine.

U.S. Pat. No. 3,392,752 issued to Iozzi et al on July 16, 1968 shows a device for mixing a plurality of gases wherein the relative proportion of the gases can be adjusted. Individual gas lines are fed through rate of flow gauges to a manifold housing by a plurality of regulating valves. After the gas flows through the regulating valves, it is mixed into a single flow. This invention finds use in mixing gases from welding and in medical applications, such applications being nonanalogous to the purpose and use of the present invention. Additionally, no means are shown or suggested to isolate the various gas supplies from each other when the gas is not being used. While this is not necessary in a device such as taught by Iozzi, it is necessary in an application where the individual gas lines are used for purposes other than to supply a manifold and the apparatus connected thereto.

U.S. Pat. No. 3,667,296 issued to Berger on July 18, 1972 shows a fluid proprtioning system wherein gas is supplied through two fluid regulators having input gauges, then to a pair of independent flow meters, and then to a pair of independent valves. The gas is then channeled through a manifold to a single output. No means are shown or suggested to avoid interaction between the two gas supplies.

Even considering the diverse and mostly nonanalogous art discussed above, no fluid proportioning system for use with a fluid fueled apparatus and a plurality of discrete fluid supplies wherein the discrete fluid supplies are isolated from each other so that they may be used to fuel other apparatuses in addition to the common fluid fueled apparatus is shown or suggested.

The present invention overcomes the shortcomings presently manifested in supplying a plurality of dwelling units from a single fluid fueled apparatus by providing a fluid proportioning system which apportions fuel usage among a plurality of metered fluid fuel supplies, the fluid fuel supplies being isolated from each other when the fluid fueled apparatus is not in use.

SUMMARY OF THE INVENTION

Therefore, a primary object of the present invention is to provide a fluid proportioning system for use with a fluid fueled apparatus and a plurality of discrete fluid supplies wherein fluid fuel use can be apportioned between the fluid supplies.

A further object of the present invention is to provide a fluid proportioning system which can be used in conjunction with a gas furnace.

A still additional object of the present invention is to provide a fluid proportioning system wherein the proportioned fuel supplies are isolated from each other when not employed for common usage.

A still further object of the present invention is to provide a fluid proportioning system suitable for use in multidwelling units wherein each unit of the dwelling shares usage of a common fluid fueled apparatus.

Still another object of the present invention is to provide a gas proportioning system for use with a gas fueled furnace, the common usage of which is shared by a plurality of separate dwelling units, each of the dwelling units having an individually metered gas supply, each of the metered gas supplies being used to fuel other appliances located in the dwelling units.

Still another further object of the present invention is to provide a method of proportioning fuel usage between a plurality of separate dwelling units each supplied by a single fuel consumptive apparatus.

Another further object of the present invention is to provide a fluid fuel proportioning system which is readily adaptable to currently existing gas fueled furnaces.

Another still further object of the present invention is to provide a fluid proportioning system which can be installed for use without major modification to existing heating systems.

Another still additional and further object of the present invention is to provide a fluid proportioning system which can be assembled from generally available components.

Another object is to avoid the need to replace a single furnace in a multidwelling unit with a plurality of furnaces thereby avoiding the attendant increased energy usage.

Another still further additional object of the present invention is to provide a fluid proportioning system which is simple in design, relatively inexpensive to manufacture, rugged in construction, easy to employ, and efficient in operation.

These objects, as well as further objects and advantages of the present invention, will become readily apparent after reading the ensuing description of the non-limiting illustrative embodiments and viewing of the accompanying drawing.

A fluid proportioning system for use with a fluid fueled apparatus and a plurality of discrete fluid supplies according to the principles of the present invention comprises a manifold having a plurality of inputs and an output adapted to be in communication with the fluid input of the fluid fueled apparatus; a plurality of fluid pressure measuring and fluid pressure varying means each having an input and an output, the outputs of each of the plurality of fluid pressure measuring and fluid pressure varying means being in communication with one of the inputs of the manifold, each of the fluid pressure measuring and fluid pressure varying means inputs being in communication with one of the discrete fluid supplies; and a plurality of simultaneously operable valve means, each of the valve means being operably connected to and in communication with one of the fluid supplies, the plurality of valve means selectively isolating the fluid supplies from each other.

BRIEF DESCRIPTION OF THE DRAWING

In order that the present invention may be more fully understood, it will now be described, by way of example, with reference to the accompanying Figure which is a pictorial and schematic representation of one embodiment of the present invention.

DESCRIPTION OF THE PREFERRED EMBODIMENTS

Referring now to the Figure, there is illustrated therein a fluid proportioning system 10 which incorporates the principles of the present invention. The fluid proportioning system 10 is configured for use in supplying a gas furnace, not illustrated, from a main gas supply 12. Although the invention is shown in this particular environment, it is done merely for purposes of illustration and it is to be understood that the present invention may be used in other environments, in conjunction with fuels other than gas, and with fuel consumptive apparatuses other than gas furnaces. For instance, the teachings of the present invention are equally applicable to a hot water supply which is provided to multiple locations from a single hot water heater.

The gas supply 12, which may be from a public utility or a common storage tank, is fed to a plurality of gas meters 14, 16, 18, and 20 through a pipe or conduit 21. Pipe 21, as well as other pipes hereinafter mentioned, is shown and described as comprising a plurality of different length sections and a plurality of couplings or fittings. However, this is merely meant to be illustrative and any piping configuration or other means for permitting the communication of the elements of the present invention and specifically for permitting the inputs of the meters 14, 16, 18, and 20 to be in direct communication with the gas supply 12 can be employed by one skilled in the art within the scope of the invention.

The outputs of the gas meters 14, 16, 18, and 20 are coupled, respectively, to T connectors 22, 24, 26, and 28. These T connectors provide first outputs 30, 32, 34, and 36 which are in communication, through pipes 38, 40, 42, and 44, respectively, to whatever appliances individual tenants may have in their dwelling unit for their own exclusive use. For instance, pipe 38 can be connected to a tenant's gas stove and range. Similarly, pipe 40 may be connected to another tenant's gas stove, gas range, and gas clothes dryer. In a likewise manner, pipes 42 and 44 are also connected to appliances which are used solely by a single dwelling unit. T connectors 22, 24, 26, and 28 each also have second outputs 46, 48, 50, and 52, respectively, which are coupled through pipes, respectively, 54, 56, 58, and 60 to the inputs of valves, respectively, 62, 64, 66, and 68. The valves 62, 64, 66, and 68 in conjunction with pressure gauges 70, 72, 74, and 76, respectively, are in communication therewith through, respectively, pipes 78, 80, 82, and 84, thereby forming, respectively, fluid pressure measuring and fluid pressure varying apparatuses 86, 88, 90, and 92. The valves 62, 64, 66, and 68 are variable between a closed position and a fully openable position and are preferably of the precision type which are fully calibrated. The pressure gauges 70, 72, 74, and 76 each measure the pressure, respectively, between pipes 78, 80, 82, and 84 and, respectively, pipes 94, 96, 98, and 100 which are hooked between the outputs of the pressure gauges 70, 72, 74, and 76, respectively, and a plurality of electrically operated valves 102, 104, 106, and 108.

The outputs of the electrically operated valves 102, 104, 106, and 108, are coupled to a manifold 110, respectively, by pipes 112, 114, 116, and 118. The output 120 of the manifold 110 is connected by a pipe 122 to a master shut off valve 124, the master shut off valve being connected by a pipe 126 to a master pressure gauge 128. The output of the master pressure gauge 128 is connected through a pipe 130 to a gas fueled furnace, not illustrated.

The electrically operated valves 102, 104, 106, and 108 are of the solenoid type and are simultaneously activated by a relay 132 which is operably coupled to the electrically operated valves 102, 104, 106, and 108 and to the control system of the furnace, not illustrated, in the same manner as a conventional furnace relay is connected to the control system thereof. When a furnace control system of a conventional type senses, by the thermostat thereof, that the furnace system should be activated, voltage is applied to a relay which opens a gas valve. When the relay 132 is hooked to the furnace control system, it also will be activated and will place a selected voltage on the solenoid valves 102, 104, 106, and 108 to open these devices thereby permitting the passage of gas therethrough. When the solenoid valves 102, 104, 106, and 108 are deactivated, they preclude the passage of gas therethrough. The solenoid valves 102, 104, 106, and 108, as well as the relay 132, may be activated by readily available 110 V AC house current or they can be activated by a 24 V or other low voltage current if such is used in the furnace control system or if such low voltage is otherwise desirable.

In employing the system 10, the square footage of each of the individual dwelling units associated with gas meters 14, 16, 18, and 20 would be calculated to determine the number of BTU's of heat needed to heat these units. The method of calculating such quantities of heat are well known in the art and factors such as insulation, exposure, outside walls, and windows can be taken into consideration. However, all these factors except for square footage are assumed to be equal for purposes of simplicity of illustration. The manner in which the valves 62, 64, 66, and 68 are adjusted to apportion gas usage can be illustrated by assuming that the dwelling units associated with meters 14 and 16 are of equal size and the dwelling units associated with meters 18 and 20 are equal in size to each other, the dwelling units associated with meters 14 and 16 being one half the size of the dwelling units associated with meters 18 and 20. In a conventional installation, gas pressure is approximately twenty-five to thirty pounds per square inch. For purposes of illustration, it is assumed that the pressure is thirty pounds per square inch. Using the example above, valves 62 and 64 would be adjusted so that pressure gauges 70 and 72 had a pressure reading of five pounds per square inch with valves 66 and 68 being adjusted so that gauges 74 and 76 show a pressure of ten pounds per square inch. The total pressure therefore would be thirty pounds per square inch at manifold output 120, as read by gauge 128, but the gas meters 14, 16, 18, and 20 would only be metering gas usage in proportion to gas consumption in the associated dwelling unit.

As another example, if the dwellings associated with meters 14, 16, and 18 were of equal size and if the dwelling unit associated with meter 20 was twice as large as dwellings associated with meters 14, 16, and 18, the valves 62, 64, and 66 would be adjusted so that the pressure gauges 70, 72, and 74 would read a pressure of six pounds per square inch, valve 68 being adjusted to indicate a pressure of twelve pounds per square inch at pressure gauge 76. Similarly, if each dwelling unit was equal in size and if there were four dwelling units, each valve 62, 64, 66, and 68 would be adjusted to permit a pressure of seven and one half psi at pressure gauges 70, 72, 74, and 76. Thusly, it can be seen that the individual owners of the dwelling units are contributing gas for the running of the common furnace in proportion to the amount of heat necessary to heat their dwelling unit. As a result, an equitable system is provided with each tenant paying their proportional share of the cost of purchasing gas thereby alleviating the landlord of this oppressive responsibility.

Of course, the more precisely the calculation is made to determine the quantity of heat necessary to heat a dwelling unit, the more equitable such proportioning will be.

The electrically operated valves 102, 104, 106, and 108 are provided to preclude interaction of the metered gas supplies of each separate dwelling unit when the furnace is not in use. If the valves 102, 104, 106, and 108 were not provided, and the furnace was not in use, if one of the tenants was to use gas from gas supplies 38, 40, 42, or 44, he could draw gas through the manifold 110 from the other tenants' metered gas supplies. However, since the electrically operated valves 102, 104, 106, and 108 are provided, and are in a closed position unless the furnace is operating, if the individual dwelling units use gas from the gas supplies 38, 40, 42, and 44, they will only draw gas through their own gas meters.

It should be apparent that the proportioning valves 62, 64, 66, and 68; the pressure gauges 70, 72, 74, and 76; and the electrically operated valves 102, 104, 106, and 108 can be variously interchanged in position, respectively, between the gas meters 14, 16, 18, and 20 and the manifold inputs 112, 114, 116, and 118. Such juxtaposition is considered to be well within the skill of one of ordinary skill in the art within the scope of the present invention. Similarly, the valves 62, 64, 66, and 68 can be provided as discrete components relative to the pressure gauges 70, 72, 74, and 76 or, as illustrated, can be embodied by a single unit which performs both pressure varying and pressure measuring functions. As an alternative within the scope of the present invention, fluid pressure measuring and fluid pressure varying apparatuses 86, 88, 90, and 92 can comprise calibrated mechanical gas control valves of the type used in gas ranges and ovens.

The master valve 124 is provided to permit shutoff of the output 120 of the manifold 110 as desired for servicing of the furnace or in other situations where such a condition is desirable. The master pressure gauge 128 is provided to make sure that the maximum pressure supplied to the furnace does not exceed the amount which it may accept. As in the examples above, such a pressure would be thirty pounds per square inch.

In order to preclude tenant tampering, the valves 62, 64, 66, and 68 should be lockable and, along with the pressure gauges 70, 72, 74, and 76 may be disposed in a single locked box to which the tenants are not permitted access.

Alternately, the valves and pressure gauges used to proportion the gas from each individual tenant's metered gas supply may be remotely variable. For instance, an electrically operated remotely calibrated valve means with a remote readout and adjustment located in each dwelling unit may be employed. The remote valve controls also necessarily would be locked, if desired, and the adjustments of the proportioning could be remotely accomplished. This might be of particular convenience where a single dwelling unit is frequently empty and, when the heat supply is turned off to such a vacant unit, the gas supply which is associated with the unit can also be turned off.

Although the system 10 hereinbefore described has been described as accommodating four dwelling units, of course, more or less dwelling units can be accommodated by the provision of additional manifold inputs, electrically operated valves, proportional valves, and pressure gauges. It also should be realized that although conventional pipe and pipe connections are shown, other specially manufactured or conventional devices or apparatuses for coupling the components of the present invention together may be employed using the skill of one of ordinary skill in the art placing such modifications within the scope of the present invention.

The teachings of the present invention are also applicable to installations wherein more than one commonly shared appliance is employed. For instance, if all the dwelling units involved use a single gas furnace and a single gas hot water heater, the output of the manifold can be connected to both of these appliances, consumption of the furnace being determined as hereinbefore described and a correctional factor being introduced as to estimated hot water use by each dwelling unit. Although this is a less precise calculation than the quantity of heat needed to heat a dwelling unit, reasonable proportioning of hot water usage can be determined based on the number of people occupying each dwelling unit.

It should be understood that various changes in the details, materials, arrangements of parts, and operational conditions which have been herein described and illustrated in order to explain the nature of the invention may be made by those skilled in the art within the principles and scope of the invention.

Having thus set forth the nature of the invention, what is claimed is:

1. A method of apportioning gas usage between a plurality of separate dwelling units all utilizing a common gas fueled appliance, each of said dwelling units having associated therewith an individual gas supply, said method comprising the steps of:

determining the quantity of heat necessary to maintain each dwelling unit at a preselected temperature;

calculating the proportion of the quantity of heat needed to maintain each dwelling unit at a preselected temperature to the total quantity of heat needed to heat all said dwelling units;

tapping each of said individual gas supplies in the same proportion as said calculated proportion corresponding to said dwelling unit associated therewith;

combining together each of said gas supplies after proportioning as recited in said last step; and supplying said combined gas supplies to said common gas fueled appliance.

2. A method in accordance with claim 1, further comprising the step of interrupting said individual gas supplies when said gas appliance is not consuming gas.

* * * * *